United States Patent
Tanigawa et al.

(10) Patent No.: US 8,509,793 B2
(45) Date of Patent: Aug. 13, 2013

(54) COMMUNICATION METHOD AND COMMUNICATION SYSTEM

(75) Inventors: Hironobu Tanigawa, Kanagawa (JP); Yasuhiro Nakamura, Kanagawa (JP); Nobuaki Takamatsu, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 726 days.

(21) Appl. No.: 12/666,271

(22) PCT Filed: May 23, 2008

(86) PCT No.: PCT/JP2008/059515
§ 371 (c)(1),
(2), (4) Date: Mar. 11, 2010

(87) PCT Pub. No.: WO2009/001640
PCT Pub. Date: Dec. 31, 2008

(65) Prior Publication Data
US 2010/0178926 A1    Jul. 15, 2010

(30) Foreign Application Priority Data

Jun. 28, 2007 (JP) ................ P2007-170505

(51) Int. Cl.
*H04W 72/00* (2009.01)
*H04W 4/00* (2009.01)
*H04M 1/00* (2006.01)
*H04B 7/212* (2006.01)

(52) U.S. Cl.
USPC ........ 455/450; 455/452.1; 455/561; 370/329; 370/348

(58) Field of Classification Search
USPC .............. 455/411, 452.1, 522, 550, 561, 450, 455/509, 550.1; 370/280, 395.52, 466, 469, 370/471, 208, 252, 312, 328, 329, 335, 343, 348, 437; 375/219, 260, 295, 296
See application file for complete search history.

(56) References Cited

U.S. PATENT DOCUMENTS 6,115,392 A * 9/2000 Nomura ............... 370/466
7,693,116 B2 4/2010 Nagai
(Continued)

FOREIGN PATENT DOCUMENTS

EP    1 534 039    5/2005
EP    1 628 413    2/2006
(Continued)

OTHER PUBLICATIONS

Decision of Refusal (including translation) for JP 2007-170505, mailed Aug. 30, 2011, 9 pages.
(Continued)

*Primary Examiner* — George Eng
*Assistant Examiner* — Inder Mehra
(74) *Attorney, Agent, or Firm* — Duane Morris LLP

(57) ABSTRACT

Present invention provides a communication method and a communication system that can provide more detailed communication control, larger transmission capacity, and more flexible resource distribution to users in comparison with a communication method using a conventional frame format. There are provided a downlink frame generator 14 that generates a downlink frame for a downlink period in which a cell station 10 communicates with at least one personal station of the plurality of personal stations 20 in a predetermined frame format, and an uplink frame generator 24 that generates an uplink frame for an uplink period in which at least one personal station of the plurality of personal stations communicates with the cell station 10 in a predetermined frame format, wherein the frame format of the downlink frame includes a MAP field that notifies, in the downlink period, each personal station of information indicating an available or unavailable subchannel for each personal station.

12 Claims, 12 Drawing Sheets

(56) References Cited

U.S. PATENT DOCUMENTS

| | | | |
|---|---|---|---|
| 7,715,877 B2 | 5/2010 | Nakao | |
| 7,738,924 B2 | 6/2010 | Nakao | |
| 8,036,165 B2 | 10/2011 | Miyata et al. | |
| 2004/0022252 A1* | 2/2004 | Jang et al. | 370/395.52 |
| 2005/0107036 A1 | 5/2005 | Song et al. | |
| 2005/0159162 A1 | 7/2005 | Park | |
| 2006/0040619 A1 | 2/2006 | Cho et al. | |
| 2006/0209783 A1 | 9/2006 | Jain | |
| 2008/0045270 A1* | 2/2008 | Suga | 455/561 |
| 2008/0130605 A1 | 6/2008 | Song et al. | |
| 2008/0130643 A1 | 6/2008 | Jain | |
| 2008/0153504 A1* | 6/2008 | Bourlas et al. | 455/452.1 |
| 2008/0232401 A1* | 9/2008 | Ahmadi et al. | 370/469 |
| 2009/0262670 A1* | 10/2009 | Cho et al. | 370/280 |
| 2009/0323563 A1* | 12/2009 | Ho et al. | 370/280 |
| 2010/0178926 A1* | 7/2010 | Tanigawa et al. | 455/450 |
| 2011/0177794 A1* | 7/2011 | Nylander et al. | 455/411 |

FOREIGN PATENT DOCUMENTS

| | | |
|---|---|---|
| EP | 1 855 405 | 11/2007 |
| JP | 11-127484 | 5/1999 |
| JP | 2000-115834 | 4/2000 |
| JP | 2000-236343 | 8/2000 |
| JP | 2004-328586 | 11/2004 |
| JP | 2006-014080 | 1/2006 |
| JP | 2006-173662 | 6/2006 |
| JP | 2006-237658 | 9/2006 |
| JP | 2006-237934 | 9/2006 |
| JP | 2006-295745 | 10/2006 |
| JP | 2006-345363 | 12/2006 |
| JP | 2007-081625 | 3/2007 |
| JP | 2007-511163 | 4/2007 |
| JP | 2007-511975 | 5/2007 |
| JP | 2008-511201 | 4/2008 |
| WO | WO-2005/050875 | 6/2005 |
| WO | WO-2006/019287 | 2/2006 |
| WO | WO-2006/092899 | 9/2006 |
| WO | WO-2006/102469 | 9/2006 |
| WO | WO-2006/132247 | 12/2006 |

OTHER PUBLICATIONS

International Search Report for PCT/JP2008/059515, mailed on Jun. 17, 2008, 2 pages.

Notification of Reasons for Refusal (with translation) for JP 2007-170505, mailed May 31, 2011, 7 pages.

* cited by examiner

COMMUNICATION METHOD AND COMMUNICATION SYSTEM

TECHNICAL FIELD

CROSS REFERENCE TO RELATED APPLICATION

The present invention is a U.S. National Phase Application of International Application No. PCT/JP2008/059515, filed May 23, 2008, which claims priority to and the benefit of Japanese patent Application No. 2007-170505, filed Jun. 28, 2007, which relates to a communication method and a communication system, and more particularly, to a communication method and a communication system using an OFDMA scheme as a wireless access scheme of a digital mobile phone system, a PHS system, or the like. The entire contents of these applications are incoporated herein by reference

BACKGROUND ART

As a wireless access scheme of a digital mobile phone system or a PHS system, a Time Division Multiple Access/Time Division Duplex (TDMA/TDD) scheme in which TDMA and TDD are combined has been adopted. Recently, an Orthogonal Frequency Division Multiplexing Access (OFDMA) scheme using OFDMA based on a technique of Orthogonal Frequency Division Multiplexing (OFDM) has been proposed.

The OFDM is a scheme for dividing a carrier for modulating data into a plurality of "subcarriers" (sub-divided carriers) orthogonal to each other and distributing and transmitting data signals in the subcarriers.

Next, the OFDM scheme will be schematically described.

FIG. 10 is a block diagram showing a configuration of an OFDM modulation device to be used at a transmitting side. Transmission data is input to the OFDM modulation device. The transmission data is supplied to a serial/parallel converter 201, and is converted into data configured with a plurality of low-speed transmission symbols. That is, transmission information is divided to generate a plurality of low-speed digital signals. The parallel data is supplied to an Inverse Fast Fourier Transform (IFFT) section 202.

The parallel data is allocated to OFDM subcarriers and is mapped in a frequency domain. Here, a modulation process of BPSK. QPSK, 16QAM, 64QAM, or the like is performed on the subcarriers. The mapping data is converted from frequency-domain transmission data to time-domain transmission data by performing the IFFT operation. Thereby, multi-carrier modulation signals are generated by independently modulating the plurality of subcarriers orthogonal to each other. An output of the IFFT section 202 is supplied to a guard interval adder 203.

As shown in FIG. 11, the guard interval adder 203 sets a rear part of a valid symbol of the transmission data to a guard interval and copies and adds the guard interval to a front part of a valid symbol period for every transmission symbol. A baseband signal obtained by the guard interval adder is supplied to an orthogonal modulator 204.

The orthogonal modulator 204 performs an orthogonal modulation process on the baseband OFDM signal supplied from the guard interval adder 203 using a carrier signal supplied from a local oscillator 205 of the OFDM modulation device and performs frequency conversion into an intermediate frequency (IF) or radio frequency (RF) signal. That is, the orthogonal modulator converts the baseband signal into a desired transmission frequency band and then outputs the converted signal to a transmission path.

FIG. 12 is a block diagram showing a configuration of an OFDM demodulation device to be used at a receiving side. An OFDM signal generated by the OFDM modulation device of FIG. 10 is input to the OFDM demodulation device via a predetermined transmission path.

An OFDM reception signal input to the OFDM demodulation device is supplied to an orthogonal demodulator 211. The orthogonal demodulator 211 performs an orthogonal demodulation process on the OFDM reception signal using a carrier signal supplied from a local oscillator 212 of the OFDM demodulation device, performs frequency conversion from an RF or IF signal to a baseband signal, and obtains a baseband OFDM signal. The OFDM signal is supplied to a guard interval remover 213.

The guard interval remover 213 removes a signal added by the guard interval adder 203 of the OFDM modulation device in response to a timing signal supplied from symbol timing synchronizer (not shown). The signal obtained from the guard interval remover 203 is supplied to a Fast Fourier Transform (FFT) section 214.

The FFT section 214 converts input time-domain reception data into frequency-domain reception data by means of an FFT operation. Parallel data for subcarriers is generated by demapping in the frequency domain. With this process, the subcarriers modulated by BPSK, QPSK, 16QAM, 64QAM, or the like are demodulated. The parallel data obtained from the FFT section 214 is supplied to a parallel/serial converter 215, such that the reception data is output.

The above-described OFDM is a scheme for dividing a carrier into a plurality of subcarriers. The OFDMA is a scheme for performing multiplex communication by grouping a plurality of subcarriers gathered from among OFDM subcarriers and allocating one or more groups to users. Each group is called a subchannel. That is, the users perform communication using one or more subchannels. Subchannels are adaptively increased and allocated according to an amount of communication data or a transmission environment.

Next, an example of a channel configuration in a communication system adopting the OFDMA scheme will be described.

Patent Document 1 describes a communication method by asymmetric channels whose bandwidths are different from each other in which downstream link (downlink) communication is performed by a broadband channel and upstream link (uplink) communication is performed by a narrowband channel.

FIG. 13 shows a configuration of transmission control between a terminal device and a base station in Patent Document 1. An OFDMA scheme is applied as an access scheme, and different time slots within one frame are used in time division in the upstream link and the downstream link.

A predetermined number of slots T1, T2, - - - , Tn (n is an arbitrary integer) of a first half of one frame are slots of an uplink period Tu and are slots to be used for uplink transmission from the terminal device to the base station. A predetermined number of slots, R1, R2, - - - , Rn (n is an arbitrary integer) of a second half of one frame are slots of a downlink period Td and are slots to be used for downlink transmission from the base station to the terminal device. Frames of different uplink and downlink periods (in which uplink and downlink times are different from each other and uplink and downlink slots are different from each other) are called up-down asymmetric frames.

FIG. 14 is an example of a configuration of a channel on which frame data is wirelessly transmitted. In this example, on lower and upper sides of an available frequency band B0, guard band parts B1 and B2 having narrower bandwidths than broadband channels CH1 to CH4 are present. On B1 and B2, narrowband channels CH5 and CH6 having narrower bandwidths than the broadband channels CH1 to CH4 are placed.

The narrowband channels CH5 and CH6 placed on the guard band parts are used as low-speed access dedicated communication channels in the upstream link (uplink). Only the uplink period Tu of the first half of the frame configuration shown in FIG. 13 is used for radio transmission.

Patent Document 2 describes a communication method for performing communication between a base station and a mobile station by allocating a time slot to be used to each communication party on the basis of a transmission waiting cell for each of the downstream link (downlink) and the upstream link (uplink), and describes a communication system adopting an OFDMA/TDD scheme for allocating user channels according to transmission and reception amounts and QoS of asymmetric channels. FIG. 15 is a schematic diagram showing a configuration of the communication system of Patent Document 2. Communication adopting the OFDMA scheme is performed between the base station (BTS) and the mobile station (MS).

FIG. 16 is a schematic diagram showing a frame format used in a radio communication system of Patent Document 2. As shown in FIG. 16, a unit frame (1 frame) includes an access channel Ach, an uplink control channel Cch, a downlink control channel Cch, a downlink user channel Uch, and an uplink user channel Uch.

The number of time slots included in each of the user downlink and uplink channels is not fixed and a boundary position is determined based on a user channel allocation result.

Patent Document 1: JP-A-2000-115834
Patent Document 2: JP-A-2000-236343

DISCLOSURE OF THE INVENTION

Problem that the Invention is to Solve

However, in the frame format based on the conventional method, there is a problem in that transmission capacity may not easily changed and flexibility of a resource distribution to a user is lack. There is another problem in that a technique of an adaptive array antenna is not considered.

The present invention has been made to address the above problems and an object of the invention is to provide a communication method and a communication system that can provide more detailed communication control, larger transmission capacity, and more flexible resource distribution to users in comparison with a communication method using a conventional frame format.

Means for Solving the Problem

To address the above problem, the present invention provides a communication method for performing communication using one or more subchannels between a cell station and a plurality of personal stations, including: performing communication with a downlink frame for a downlink period in which the cell station communicates with at least one of the personal stations and an uplink frame for an uplink period in which at least one of the personal stations communicates with the cell station, in predetermined frame formats, respectively, wherein the frame format of the downlink frame includes a MAP field that notifies, in the downlink period, each personal station of information indicating an available or unavailable subchannel for each personal station.

By employing the MAP field that notifies, in the downlink period, each personal station of information indicating the available or unavailable subchannel for each personal station, the method can provide more detailed communication control, larger transmission capacity, and more flexible resource distribution to users in comparison with a communication method using a conventional frame format.

In the communication method according to the present invention, the frame format of the uplink frame includes an field that notifies, in the uplink period, the cell station from a personal station of information distinguishing a subchannel to be used from a subchannel to be unused by the corresponding personal station among the available subchannels after notifying each personal station of the information.

By employing the RMAP field for requesting the release of a subchannel of which downlink radio quality is bad in the method, the personal station can send a response to the cell station by determining whether a subchannel indicated by the cell station is available.

In the communication method according to the present invention, the subchannels include a training symbol required at beam formation of an adaptive array.

By including the training symbol in the above method, a technique of an adaptive array antenna can be adopted in the communication method and the communication system according to the present invention.

In the communication method according to the present invention, each of the predetermined frame formats of the downlink frame and the uplink frame includes an ACKCH field serving as a field for a hybrid ARQ.

By including the ACKCH field in the above method, High Speed Downlink Packet Access (HSDPA) serving as a high-speed transmission technique can be adopted.

In the communication method according to the present invention, each of the predetermined frame formats of the downlink frame and the uplink frame includes an MI field serving as a field indicating a modulation scheme of an adaptive modulation part and a coding rate and an MR field indicating a request of a modulation scheme and a coding rate by an uplink from a personal station side.

By including the MI field and the MR field in the above method, a modulation scheme corresponding to a communication environment can be adopted.

In the communication method according to the present invention, the predetermined frame format of the downlink frame includes an SD field serving as a field to be used to adjust symbol timing between personal stations.

By including the SD field in the above method, the symbol timing between the personal stations can be adjusted by relatively controlling the symbol timing of the uplink transmitted from the personal station side.

In the communication method related to the present invention, the predetermined frame formats of the downlink frame and the uplink frame include a V field indicating validation/invalidation of a physical field.

By including the V field in the above method, an unnecessary retransmission of meaningless data can be prevented.

To address the above problem, the present invention provides a communication system for performing communication using one or more subchannels between a cell station and a plurality of personal stations, including: a downlink frame generator that generates a downlink frame for a downlink period in which the cell station communicates with at least one of the plurality of personal stations in a predetermined frame format; and an uplink frame generator that generates an uplink frame for an uplink period in which at least one of the plurality of personal stations communicates with the cell station in a predetermined frame format, wherein the frame format of the downlink frame includes a MAP field that notifies, in the downlink period, each personal station of information indicating an available or unavailable subchannel for each personal station.

The above configuration can provide more detailed communication control, larger transmission capacity, and more flexible resource distribution to users in comparison with a communication method using a conventional frame format.

In the communication system according to the present invention, the frame format of the uplink frame includes an RMAP field that notifies, in the uplink period, the cell station from a personal station of information distinguishing a subchannel to be used from a subchannel to be unused by the corresponding personal station among the available subchannels after notifying each personal station of the information.

According to the above configuration, the personal station can send a response to the cell station by determining whether a subchannel indicated by the cell station is available.

In the communication system according to the present invention, the subchannels include a training symbol required upon beam formation of an adaptive array.

According to the above configuration, a technique of an adaptive array antenna can be adopted in the communication method and the communication system related to the present invention.

In the communication system related to the present invention, the predetermined frame formats of the downlink frame and the uplink frame include an ACKCH field serving as a field for a hybrid ARQ.

According to the above configuration, High Speed Downlink Packet Access (HSDPA) serving as a high-speed transmission technique can be adopted.

In the communication system according to the present invention, the predetermined frame formats of the downlink frame and the uplink frame include an MI field serving as a field indicating a modulation scheme of an adaptive modulation part and a coding rate and an MR field indicating a request of a modulation scheme and a coding rate by an uplink from a personal station side.

According to the above configuration, a modulation scheme corresponding to a communication environment can be adopted.

In the communication system according to the present invention, the predetermined frame format of the downlink frame includes an SD field serving as a field to be used to adjust symbol timing between personal stations.

According to the above configuration, the symbol timing between the personal stations can be adjusted by relatively controlling the symbol timing of the uplink transmitted from the personal station side.

In the communication system according to the present invention, the predetermined frame formats of the downlink frame and the uplink frame include a V field indicating validation/invalidation of a physical field.

According to the above configuration, an unnecessary retransmission of meaningless data can be prevented.

Advantage of the Invention

The present invention can provide more detailed communication control, larger transmission capacity, and more flexible resource distribution to users in comparison with a communication method using a conventional frame format.

DESCRIPTIONS OF THE REFERENCE NUMERALS

10: CELL STATION
11, 21: QoS CONTROLLER
12, 22: SCHEDULER
13, 23: BAND ALLOCATOR
14: DOWNLINK FRAME GENERATOR
15, 25: MODULATOR
16, 26: TRANSMITTER
17, 27: COMMUNICATION MANAGER
20: TERMINAL
24: UPLINK FRAME GENERATOR
S1 to S4: TIME SLOT
$C_1$ to $C_4$: CONTROL SUBCHANNEL
$T_1$ to $T_{108}$: TRAFFIC SUBCHANNEL

Best Mode for Carrying Out the Invention

Hereinafter, embodiments of a communication method and a communication system according to the present invention will be described in detail with reference to the accompanying drawings.

Figure 1:
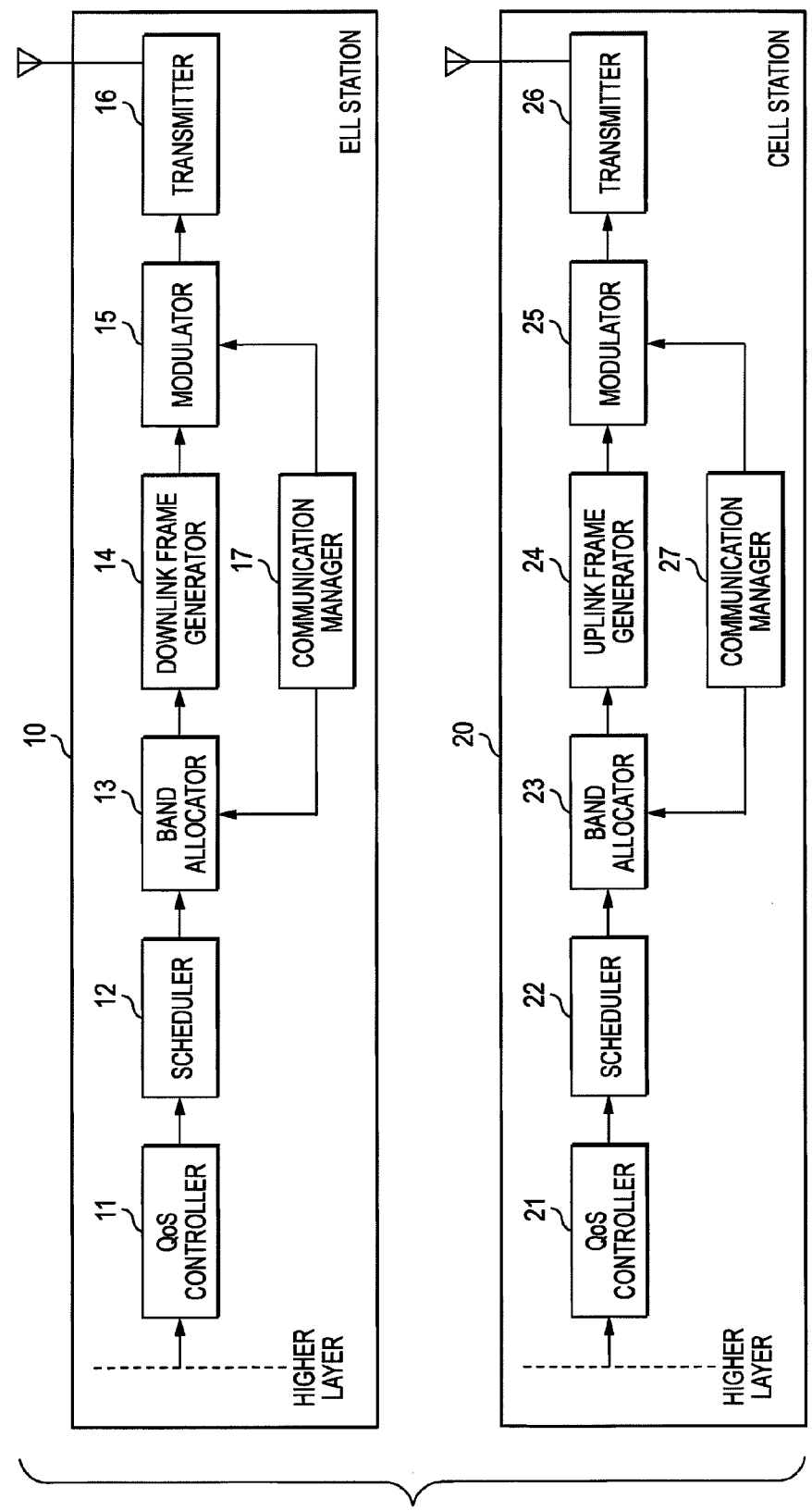
FIG. 1 is a block diagram showing transmission functions of a cell station and a personal station in a communication system according to an embodiment of the present invention.

The communication method performs communication based on a frame configured with a plurality of subchannels in each frequency band between a cell station (CS) and a plurality of personal stations (PSs). FIG. 1 is a block diagram showing transmission functions of the cell station and the personal station in the communication system according to an embodiment of the present invention.

For the transmission function of a cell station 10 as shown in FIG. 1, there are provided a QoS controller 11 for classifying data sent from a higher layer into QoS classes according to communication priorities, a scheduler 12 for scheduling communication according to the priorities of the classes, a band allocator 13 for allocating subchannels described below in every slot, a downlink frame generator 14 for generating a downlink frame for a downlink period in which communication with a personal station 20 is performed, a modulator 15 for modulating a signal of the downlink frame, a transmitter 16 for transmitting a radio signal to the personal station, and a communication manager 17 for managing communication by controlling the band allocator 13 and the modulator 15. The downlink frame generator 14 generates the downlink frame by combining four continuous physical frames sent from the higher layer through the QoS controller 11 and the scheduler 12 and allocated to subchannels through the band allocator 13.

For the transmission function of the personal station 20, there are provided a QoS controller 21 for classifying data sent from a higher layer into QoS classes according to communication priorities, a scheduler 22 for scheduling communication according to the priorities of the classes, a band allocator 23 for allocating subchannels described below in every slot, an uplink frame generator 24 for generating an uplink frame of an uplink period in which communication with the cell station 10 is performed, a modulator 25 for modulating a signal of the uplink frame, a transmitter 26 for transmitting a radio signal to the cell station, and a communication manager 27 for managing communication by controlling the band allocator 23 and the modulator 25. The uplink frame generator 24 generates the uplink frame by combining four continuous physical frames sent from the higher layer through the QoS controller 21 and the scheduler 22 and allocated to subchannels through the band allocator 23.

Figure 2:
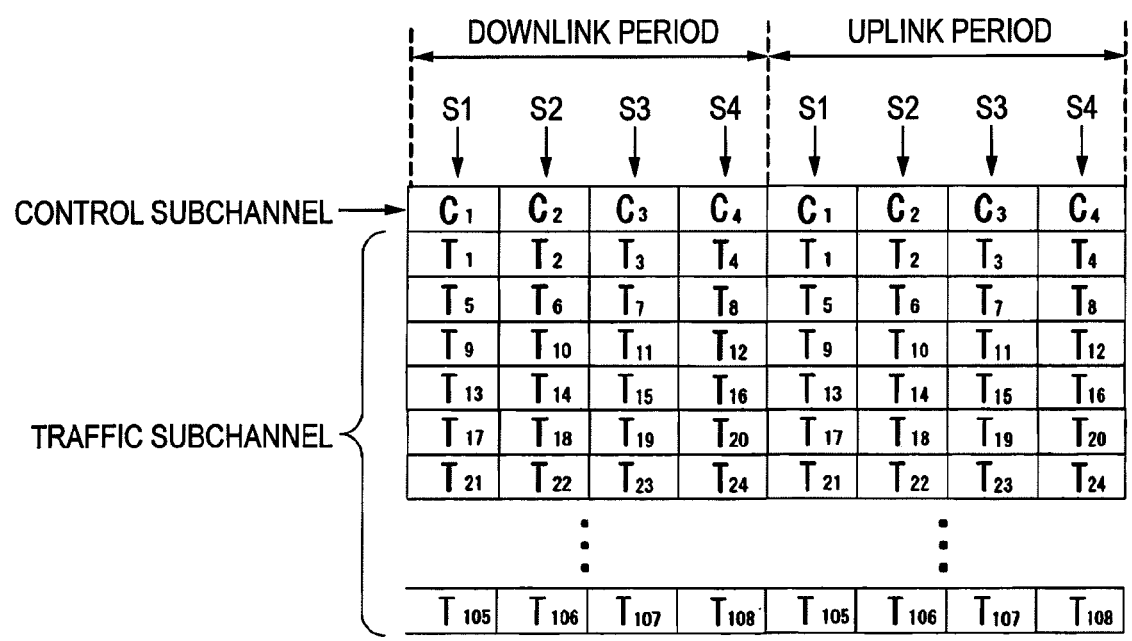
FIG. 2 is an explanatory diagram showing an OFDMA frame configuration used in a communication method according to an embodiment of the present invention.

FIG. 2 is an explanatory diagram showing a configuration of a frame used in the communication method according to an embodiment of the present invention.

The frame is arranged such that a time slot of a downlink period in which communication from the cell station to the personal station is performed is adjacent to a time slot of an uplink period in which communication from the personal station to the cell station is performed.

A frame configuration showing the allocation of a plurality of subchannels in the frame includes a downlink frame, which is a frame for a downlink (link from the cell station to the personal station: downstream link) period, and a frame for an uplink (link from the personal station to the cell station: upstream link).

The frame configuration of FIG. 2 includes, for example, four time slots S1 to S4 as in a conventional PHS system widely released. The vertical axis is a frequency axis and the horizontal axis is a time axis. According to this configuration, an application to the conventional PHS system is available.

In FIG. 2, both the downlink period and the uplink period are divided into 28 frequency bands with respect to the frequency axis. A subchannel allocated to a first frequency band is called a control subchannel and is used as a control channel CCH.

The first frequency band can be any of the highest frequency band and the lowest frequency band.

FIG. 2 is an example of the PHS system, and four cell stations are allocated to control subchannels $C_1$ to $C_4$.

The remaining 27 frequency bands (groups) are respectively divided into four subchannels in the time-axis direction in each time slot and are configured with a total of 108 subchannels. These are traffic subchannels $T_1$ to $T_{108}$ on which data is transmitted and received. That is, since the subchannels are divided in the time-axis direction, the number of subchannels (the number of extra subchannels) is as large as 108.

The traffic subchannels are configured with anchor subchannels and extra subchannels.

The anchor subchannel is used to notify each personal station of which subchannel a personal station uses or is used to negotiate whether data can be successfully transmitted and received in the cell station and the personal station. When communication is initiated, one anchor subchannel is allocated to each personal station, respectively.

The extra subchannel if for transmitting data to be actually used. An arbitrary number of extra subchannels can be allocated to one personal station. As the number of allocated extra subchannels increases, a band is widened, such that high-speed communication becomes possible.

Figure 3:
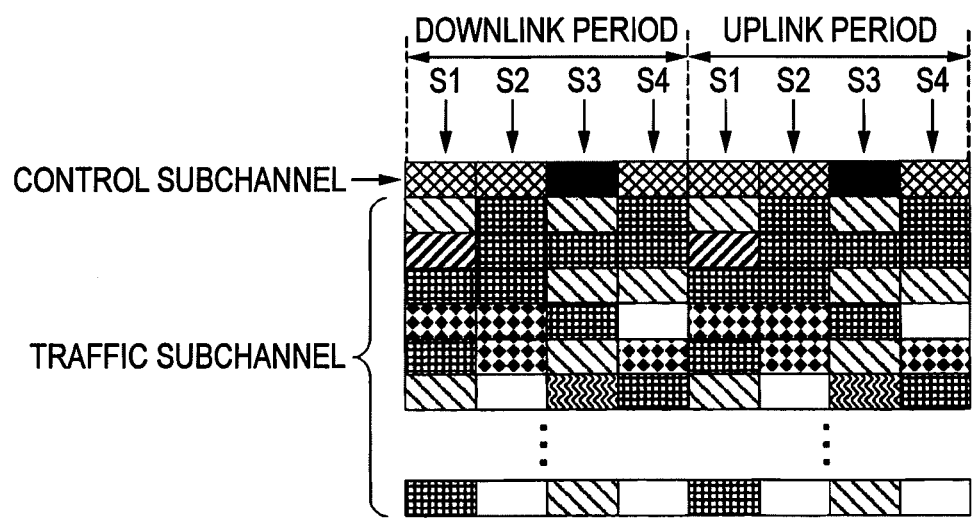
FIG. 3 is an explanatory diagram showing an example of a MAP configuration in a frame of FIG. 2.

Next, traffic subchannel allocation will be described. FIG. 3 is an explanatory diagram showing an example of subchannel allocation. In the example shown in FIG. 3, the traffic subchannel allocation is shown in various patterns.

In the example shown in FIG. 3, a control channel of a cell station of $C_3$ among four cell stations is shown in control subchannels. $C_3$, $T_2$, and the like correspond to those of FIG. 2.

An anchor subchannel $T_5$ is allocated to a personal station of a user 1. Extra subchannels $T_2$, $T_4$, $T_6$, $T_7$, $T_8$, $T_9$, $T_{10}$, $T_{15}$, $T_{17}$, $T_{24}$, - - - , $T_{105}$ are allocated to the personal station of the user 1. This allocation of subchannels is same between the downlink and the uplink.

An anchor subchannel $T_{23}$ is allocated to a personal station of a user 2. Extra subchannels $T_{13}$, $T_{14}$, $T_{18}$, $T_{20}$, - - - are allocated to the personal station of the user 2. The subchannel allocation for the user 2 is same between the downlink and the uplink as in the user 1.

$T_1$, $T_3$, $T_{11}$, $T_{12}$, $T_{19}$, $T_{21}$, - - - , $T_{107}$ are used between other cell bases and other personal stations, and $T_{16}$, $T_{22}$, - - - , $T_{106}$, $T_{108}$ are unused subchannels.

Figure 4:
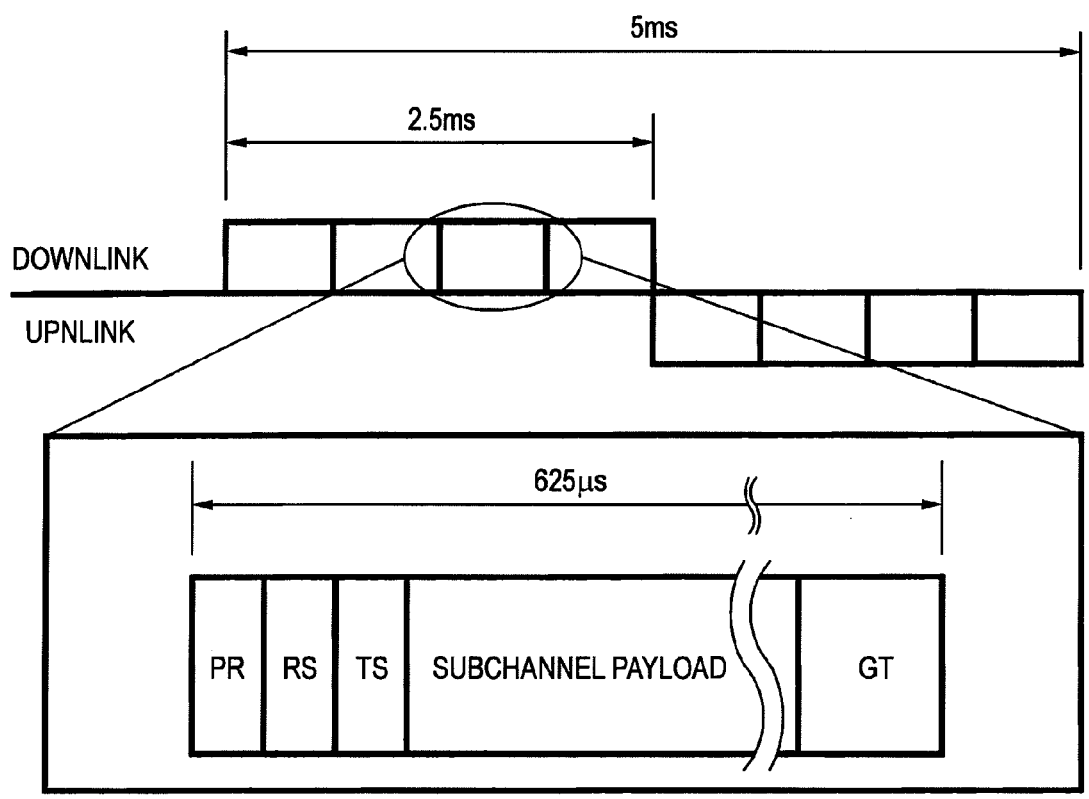
FIG. 4 is an explanatory diagram showing a subchannel format.

Next, a subchannel format will be described using FIG. 4. As shown in FIG. 4, one frequency band is configured with four downlink subchannels and four uplink subchannels and a total length in the time axis is, for example, 5 ms. Each subchannel is configured with a PReamble (PR), Pilot Symbol (PS), Training Symbol (TS), subchannel payload, and Guard Time (GT), and its length in the time axis is, for example, 625 μs.

The PR is a preamble and is a signal indicating the timing for acquiring synchronization by detecting the start of frame transmission.

The PS is a pilot symbol and is known data or a known signal waveform for obtaining a standard phase in order to specify an absolute phase of a carrier.

The TS is a training symbol required at beam formation of an adaptive array. Accordingly, a technique of an adaptive array antenna can be adopted in the communication method and the communication system according to this embodiment.

The subchannel payload is a part for accommodating data of a physical layer (PHY).

The GT is a guard time.

Next, the format of a downlink physical layer (PHY) will be described using FIG. 5.

Figure 6:
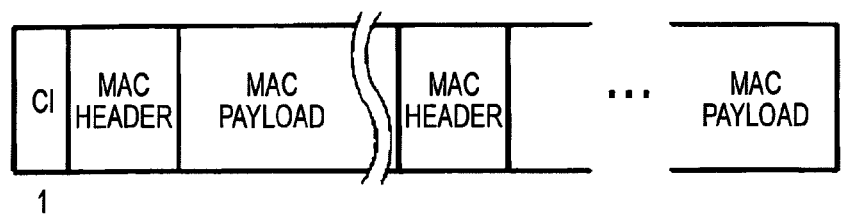
FIG. 6 is a diagram showing a configuration of a MAC format.

A subchannel payload of the anchor subchannel is configured with fields of MAP, ACKCH, SD, PC, V, MI, MR, and PHY payload. The PHY payload is transmitted in a MAC data unit and the MAC format is configured as shown in FIG. 6.

Figure 5:
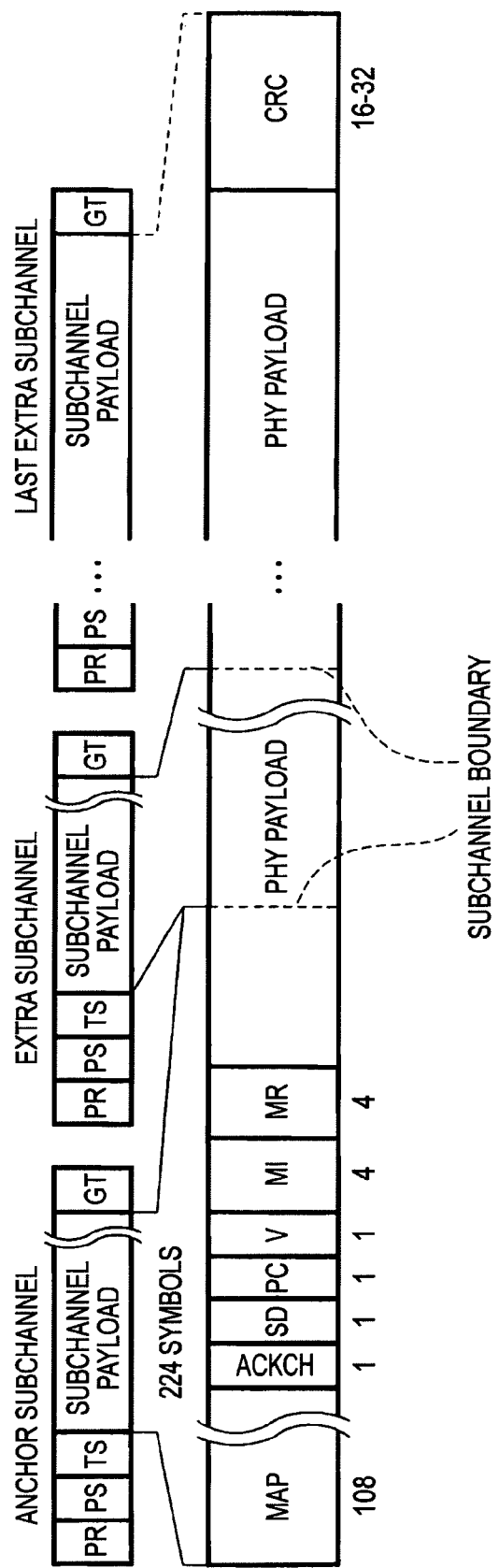
FIG. 5 is an explanatory diagram showing a downlink physical layer (PHY) format.

In FIG. 5, the MAP is a field (108 bits) for storing allocation information (MAP information) of extra subchannels to be allocated in the next frame. A bit arrangement stored in the MAP field is the MAP information to be sent to the personal station (information indicating available or unavailable subchannels for the corresponding personal station) and, while numbers are assigned to a traffic subchannel included in one frame, is indicated as a bit stream corresponding to the numbers.

The ACKCH is a hybrid Automatic Repeat Request (ARQ) field (1 bit) to be used in High Speed Downlink Packet Access (HSDPA) being a high-speed packet transmission technique.

The Shift Direction (SD) is a field (1 bit) to be used to adjust symbol timing between personal stations by relatively controlling the symbol timing of the uplink to be transmitted from the personal station side since a difference of symbol timing is interference.

The Power Control (PC) is a field (1 bit) for controlling transmission power of the uplink from each personal station, and is used to properly control a communication rate by indicating an increase or decrease of the transmission power.

The Valid (V) is a field (1 bit) indicating validation/invalidation of the PHY field and prevents an unnecessary retransmission of meaningless data. Since subchannels are up/down symmetrically allocated, there is a case where data is absent on one side. In this case, a data retransmission is unnecessary.

The Modulate Indicator (MI) is a field (4 bits) indicating a modulation scheme of an adaptive modulation part and a coding rate. Thereby, a modulation scheme corresponding to a communication environment can be adopted among a plurality of modulation schemes.

The Modulate Request (MR) is a field (4 bits) indicating a request for a modulation scheme and a coding rate by the uplink from the personal station side. The modulation scheme can be changed in response to the request from the personal station side.

The PHY payload accommodated in a subchannel payload of each extra subchannel is connected to the MR field. An end part of the last extra subchannel accommodates a Cyclic Redundancy Checking (CRC) field (16 to 32 bits) according to a PHY payload length.

Figure 7:
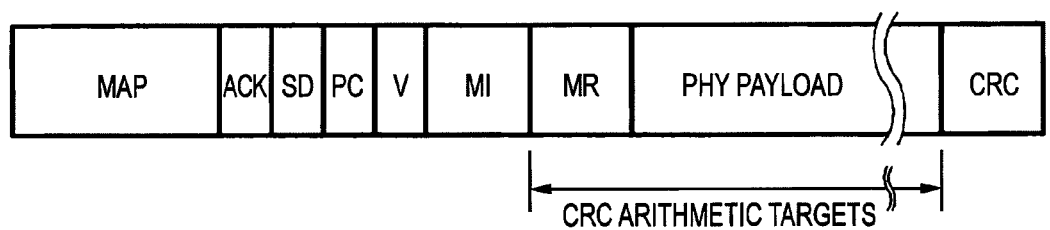
FIG. 7 is a diagram showing arithmetic targets of a CRC field in the downlink physical layer (PHY) format.

Arithmetic targets of the CRC field are the MR and the PHY payload as shown in FIG. 7. When a CRC error is present and a CRC error is eliminated by a hybrid ARQ (automatic retransmission request), the personal station invalidates the MR, PC, and SD and maintains a just previous frame state.

Figure 8:
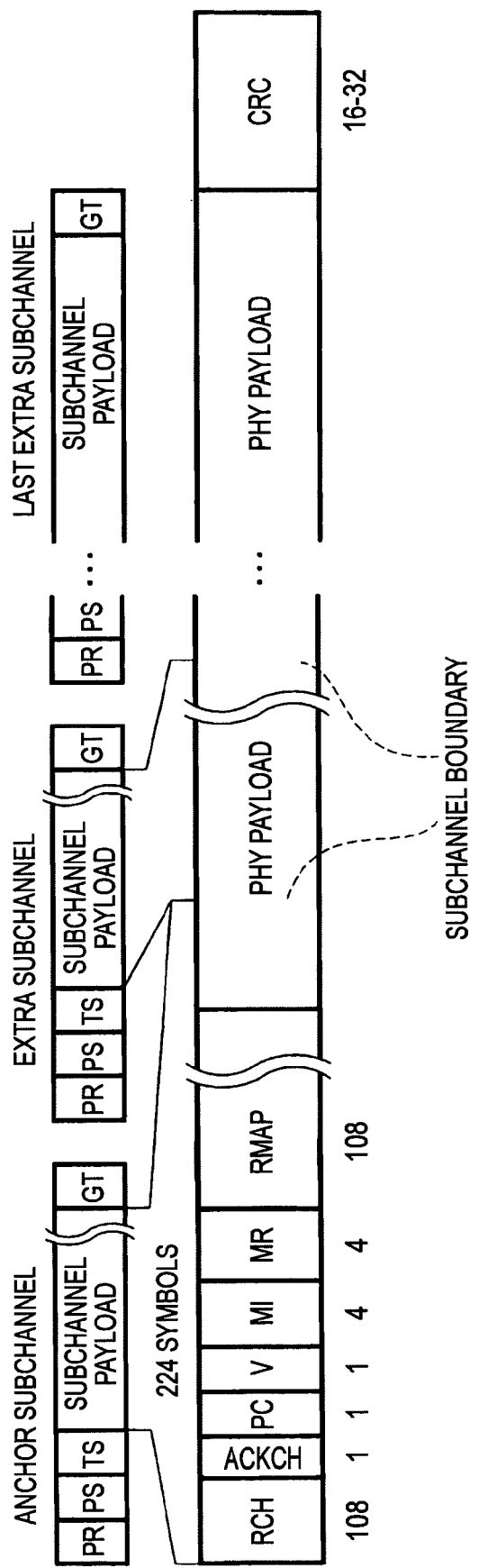
FIG. 8 is an explanatory diagram showing an uplink physical layer (PHY) format.

Next, the format of an uplink physical layer (PHY) will be described using FIG. 8.

A subchannel payload of an anchor subchannel is configured with fields of RCH, PC, V, MI, MR, RMAP, and PHY payload.

The Ranging Channel (RCH) is a field (7 bits) indicating a band request of the personal station to the cell station. Thereby, communication according to a communication environment of the personal station can be performed.

The PC, V, MI, and MR are the same as those of the format of the downlink physical layer (PHY) format.

The Refuse MAP (RMAP) is a field (108 bits) for requesting the release of a subchannel of which downlink radio quality is bad. The personal station can send a response to the cell station by determining whether a subchannel indicated by the cell station is available.

For example, since other personal stations or other cell stations are present in the vicinity of the personal station, an obstruction level by interference waves therefrom increases. When normal communication on the corresponding subchannel cannot be performed, the response indicating that the corresponding subchannel cannot be used is sent to the cell station. That is, an RMAP bit corresponding to the unavailable subchannel is set to "0."

The PHY payload accommodated in a subchannel payload of each extra subchannel is connected to the RMAP field. An end part of the last extra subchannel accommodates a CRC field (16 to 32 bits) based on a PHY payload length.

Figure 9:
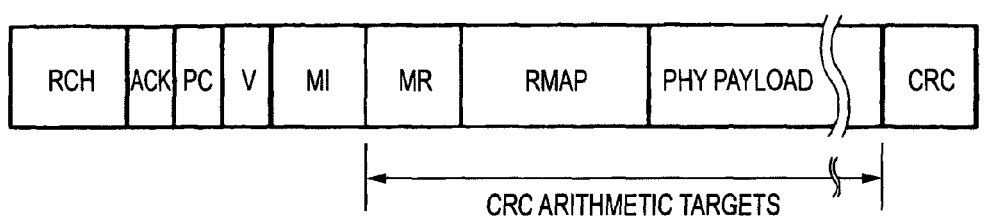
FIG. 9 is a diagram showing arithmetic targets of a CRC field in the uplink physical layer (PHY) format.
Figure 10:
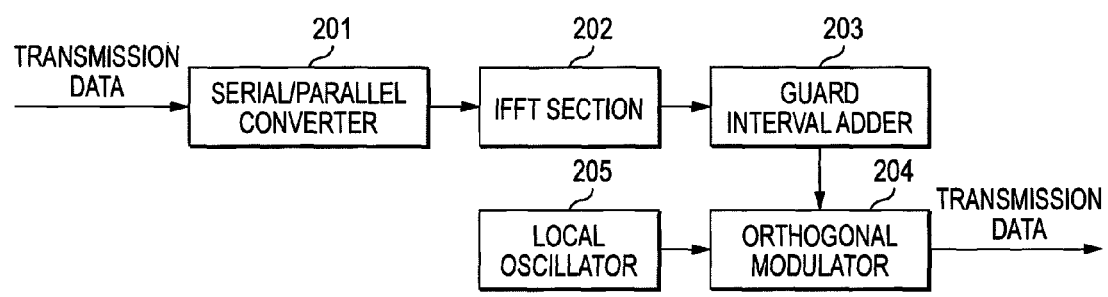
FIG. 10 is a block diagram showing a configuration of an OFDM modulation device used at a transmitting side.
Figure 11:
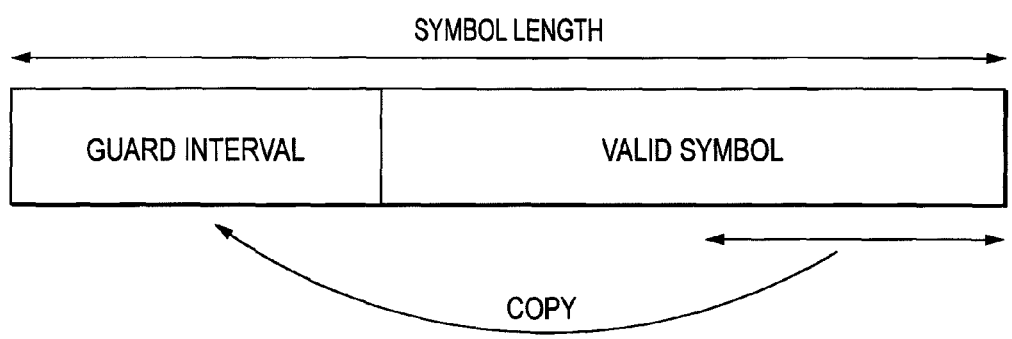
FIG. 11 is an explanatory diagram showing a guard interval.
Figure 12:
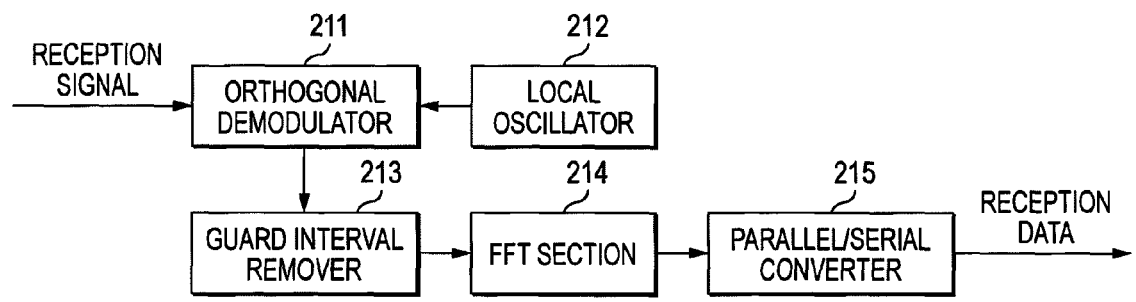
FIG. 12 is a block diagram showing a configuration of an OFDM demodulation device used at a receiving side.
Figure 13:
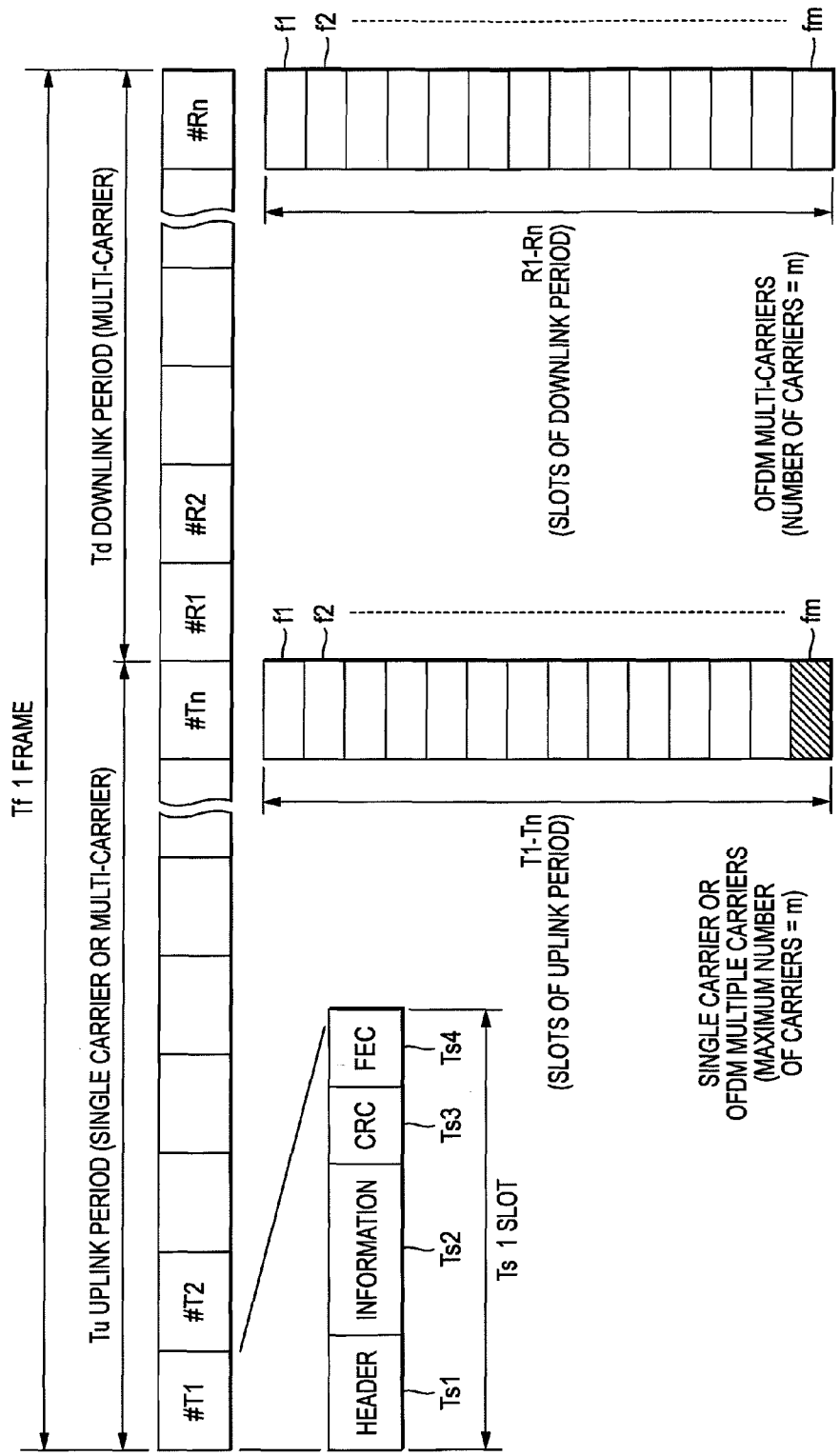
FIG. 13 is a configuration diagram of transmission control between a terminal device and a base station in Patent Document 1.
Figure 14:
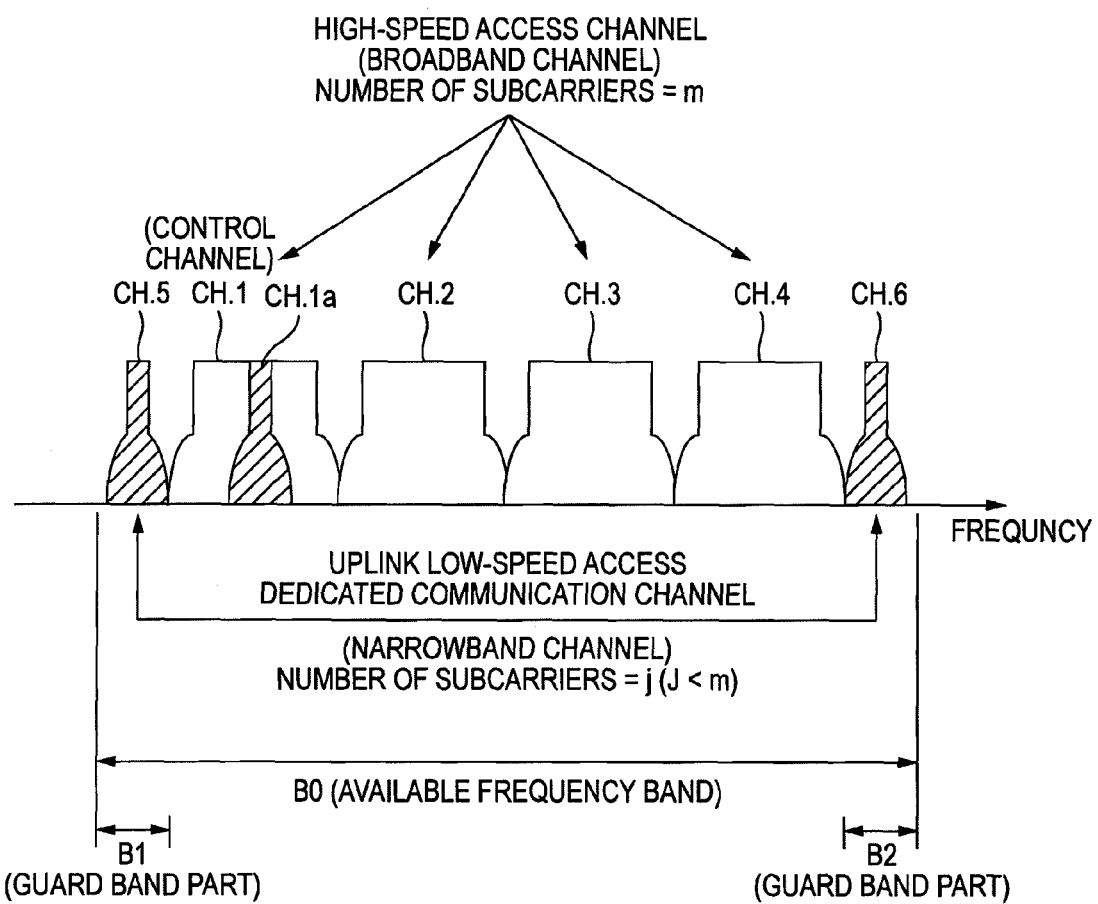
FIG. 14 is a configuration example of a channel on which data of a frame configuration of FIG. 11 is transmitted.
Figure 15:
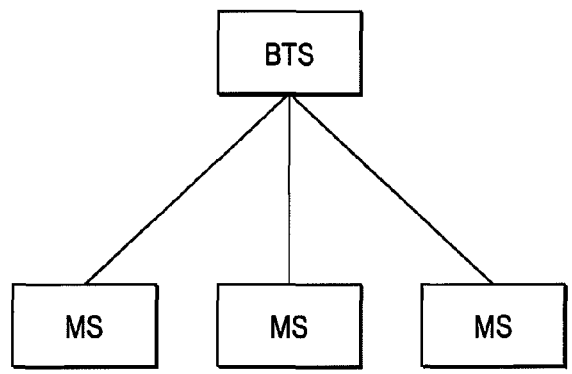
FIG. 15 is a schematic diagram showing a configuration of a communication system in Patent Document 2.
Figure 16:
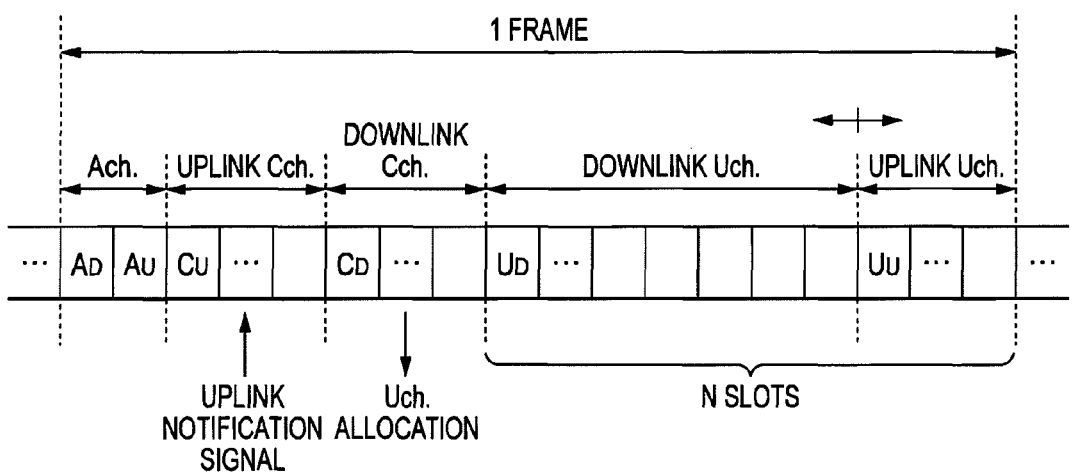
FIG. 16 is a schematic diagram showing a frame format used in a radio communication system of Patent Document 2.

Arithmetic targets of the CRC field are the MR, the RMAP, and the PHY payload as shown in FIG. 9. When a CRC error is present and a CRC error is eliminated by a hybrid ARQ (automatic retransmission request), the personal station invalidates the MR and RMAP. When the MR is invalid, a just previous frame state is maintained. When the RMAP is invalid, it is handled that a subchannel refused by the personal station is absent.

As described above, the communication system according to an embodiment of the present invention includes the downlink frame generator 14 that generates a downlink frame for a downlink period in which the cell station 10 communicates with at least one of the plurality of personal stations 20 in a predetermined frame format, and the uplink frame generator 24 that generates an uplink frame for an uplink period in which at least one of the plurality of personal stations communicates with the cell station 10 in a predetermined frame format, wherein the frame format of the downlink frame includes a MAP field that notifies each personal station of information indicating an available or unavailable subchannel for each personal station in the downlink period.

The above configuration can provide more detailed communication control, larger transmission capacity, and more flexible resource distribution to users in comparison with a communication method using a conventional frame format.

The invention claimed is:

1. A communication method for performing communication using one or more subchannels between a cell station and a plurality of personal stations, the communication method comprising:

performing communication with a downlink frame for a downlink period in which the cell station communicates with at least one of the plurality of personal stations and an uplink frame for an uplink period in which at least one of the plurality of personal stations communicates with the cell station, in predetermined frame formats, respectively, wherein the frame format of the downlink frame includes a MAP field that notifies, in the downlink period, each personal station of information indicating an available or unavailable subchannel for each personal station, and wherein the frame format of the uplink frame includes a Refuse MAP (RMAP) field that notifies, in the uplink period, the cell station from a personal station of information distinguishing a subchannel to be used from a suhchannel to be unused by the corressonding personal station among the available subchannels after notifying each personal station of the information.

2. The communication method of claim 1, wherein each of the subchannels includes a training symbol required at beam formation of an adaptive array.

3. The communication method of claim 1,
wherein each of the predetermined frame formats of the downlink frame and the uplink frame includes an ACKCH field serving as a field for a hybrid Automatic Repeat Request (ARQ).

4. The communication method of claim 1,
wherein each of the predetermined frame formats of the downlink frame and the uplink frame includes:
a Modulate Indicator (MI) field serving as a field indicating a modulation scheme of an adaptive modulation part and a coding rate; and
a Modulate Request (MR) field indicating a request of a modulation scheme and a coding rate by an uplink from a personal station.

5. The communication method of claim 1,
wherein the predetermined frame format of the dovadink frame includes an Si) field serving as a field to be used to adjust symbol timing between personal stations.

6. The communication method of claim 1,
wherein each of the predetermined frame formats of the downlink frame and the uplink frame includes a Valid field indicating validation/invalidation of a physical field.

7. A communication system for performing communication using one or more subchannels between a cell station and a plurality of personal stations, the communication system comprising,:
a downlink frame generator that generates a downlink frame for a downlink period in which the cell station communicates with at least one of the plurality of personal stations in a predetermined frame format; and
an uplink frame generator that generates an uplink frame for an uplink period in which at least one of the plurality of personal stations communicates with the cell station in a predetermined frame format,
wherein the frame format of the downlink frame includes a MAP field that notifies, in the downlink period, each personal station of information indicating an available or unavailable subchanel for each personal station, and wherein
the frame format of the uplink frame includes a Refuse MAP (RMAP) field that notifies, in the uplinkperiod, the cell station from a personal station of information distinguishing a subchannel to be used from a subchannel to be unused by the corresponding personal station among the available subchannels after notifying each personal station of the information.

8. The communication system of claim 7,
wherein each of the subchannels includes a training symbol required at beam formation of an adaptive array.

9. The communication system of claim 7,
wherein each of the predetermined frame formats of the downlink frame and the uplink frame includes an ACKCH field serving as a field for a hybrid Automatic Repeat request (ARC).

10. The communication system of claim 7,
wherein each of the predetermined frame formats of the downlink frame and the uplink frame includes:
a Modulate Indicator (MI) field serving as a field indicating a modulation scheme of an adaptive modulation part and a coding rate; and
a Modulate Request (MR) field indicating a request of a modulation scheme and a coding rate by an uplink from a personal station.

11. The communication system of claim 7,
wherein the predetermined, frame format of the downlink frame includes a shift direction (SD) fail field serving as a field to be used to adjust symbol timing between personal stations.

12. The communication system of claim 7,
wherein each of the predetermined frame formats of the downlink frame and the uplink frame includes a Valid (V) field indicating validation/invalidation of a physical field,
the degraded radio terminals, by using one of the antenna groups obtained by the division.

* * * * *